US012771587B2

(12) United States Patent
Chen et al.

(10) Patent No.: US 12,771,587 B2
(45) Date of Patent: Oct. 20, 2026

(54) SIGNAL TRANSMISSION METHOD AND APPARATUS

(71) Applicant: HUAWEI TECHNOLOGIES CO., LTD., Shenzhen (CN)

(72) Inventors: Jun Chen, Chengdu (CN); Mao Yan, Chengdu (CN); Yiling Wu, Beijing (CN); Sunjie Wang, Chengdu (CN); Yujian Tang, Chengdu (CN); Lang Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 293 days.

(21) Appl. No.: 18/604,700

(22) Filed: Mar. 14, 2024

(65) Prior Publication Data

US 2024/0223428 A1 Jul. 4, 2024

Related U.S. Application Data

(63) Continuation of application No. PCT/CN2021/118598, filed on Sep. 15, 2021.

(51) Int. Cl.
*H04L 27/26* (2006.01)
*H04L 27/36* (2006.01)

(52) U.S. Cl.
CPC .... *H04L 27/26362* (2021.01); *H04L 27/2605* (2013.01); *H04L 27/36* (2013.01)

(58) Field of Classification Search
CPC ........... H04L 27/26362; H04L 27/2605; H04L 27/36; H04L 27/02; H04L 27/2614;
(Continued)

(56) References Cited

U.S. PATENT DOCUMENTS

2012/0213312 A1* 8/2012 Futatsugi .......... H04L 25/03828 375/296
2019/0052509 A1* 2/2019 Krishnan .............. H04L 1/0043
(Continued)

FOREIGN PATENT DOCUMENTS

CN 103095628 A 5/2013
CN 111371718 A 7/2020
(Continued)

OTHER PUBLICATIONS

Extended European Search Report for Application No. 21957056 dated Sep. 2, 2024, 7 pages.
(Continued)

*Primary Examiner* — Mohamed A Kamara

(57) ABSTRACT

This application provides a signal transmission method and an apparatus, to reduce an envelope ripple of a transmission signal. The method includes: A base station obtains a first bit sequence and maps the first bit sequence to a first modulation symbol sequence, where a value of each modulation symbol in the first modulation symbol sequence belongs to a first constellation point set, the first constellation point set includes K modulation symbols, and each of the K modulation symbols has a different amplitude. The base station sequentially performs a DFT, weighting, and an IFFT on each modulation symbol in the first modulation symbol sequence to obtain a first signal. Based on the foregoing solution, an envelope ripple of the signal generated by the base station in time domain is small. This facilitates demodulation of the transmission signal by a terminal.

17 Claims, 9 Drawing Sheets

(58) Field of Classification Search
CPC ..... H04L 27/34; H04L 27/26; H04L 27/3411; Y02D 30/70; H04W 52/02
See application file for complete search history.

(56) References Cited

U.S. PATENT DOCUMENTS

| | | | | |
|---|---|---|---|---|
| 2023/0164829 | A1 * | 5/2023 | Park | H04W 74/04 370/329 |
| 2023/0216723 | A1 * | 7/2023 | Xin | H04L 27/2634 370/329 |
| 2023/0412441 | A1 * | 12/2023 | Jahan | H04L 27/2647 |
| 2025/0030588 | A1 * | 1/2025 | Xin | H04L 27/2042 |

FOREIGN PATENT DOCUMENTS

| | | | |
|---|---|---|---|
| WO | 2018184174 | A1 | 10/2018 |
| WO | 2020244392 | A1 | 12/2020 |

OTHER PUBLICATIONS

LAN/MAN Standards Committee of the IEEE Computer Society:"IEEE P802.11ba™ Dec. 2020 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 3: Wake-Up Radio Operation." IEEE P802. 11ba™ P802.11ba/D8.0, Dec. 2020. total 189 pages.

ISO 18000-6C:"EPC™ Radio-Frequency Identity Protocols Class-1 Generation-2 UHF RFID Protocol for Communications at 860 MHz-960 MHz Version 1.2.0." Oct. 23, 2008. total 108 pages.

International Search Report dated Jun. 14, 2022 in International Application No. PCT/CN2021/118598, 42 pages.

* cited by examiner

SIGNAL TRANSMISSION METHOD AND APPARATUS

CROSS-REFERENCE TO RELATED APPLICATIONS

This application is a continuation of International Application No. PCT/CN2021/118598, filed on Sep. 15, 2021, the disclosure of which is hereby incorporated by reference in its entirety.

TECHNICAL FIELD

This application relates to the field of wireless communication technologies, and in particular, to a signal transmission method and an apparatus.

BACKGROUND

With the rapid development of internet-of-things (IoT) technologies, internet of everything has become a reality. However, battery life of an internet-of-things terminal has greatly increased maintenance difficulty and costs of the terminal, and has become a major bottleneck restricting the development of the internet-of-things. Passive backscatter communication performed based on technologies of wireless power transmission, envelope demodulation, and backscattering modulation is expected to resolve problems of terminal life and maintenance, thereby making next generation passive IoT with ultra-low-cost, high-density, and maintenance-free terminals possible. In a passive IoT system, a downlink signal is generally modulated in an amplitude shift keying (ASK) or on-off keying (OOK) manner, so that a terminal may implement demodulation with extremely low power consumption. The terminal may be classified into a passive terminal and a semi-passive terminal based on whether the terminal is powered by a battery. The passive terminal is not powered by a battery. The passive terminal needs to rectify a radio frequency signal in a downlink, and use a direct current voltage output after the rectification as a power supply for use by an analog circuit and a digital circuit. The semi-passive terminal is powered by a battery and does not depend on the rectification output of the downlink signal.

In addition to the backscatter communication system, a system with a wake-up mechanism also exists. The wireless local area network (WLAN) standard 802.11ba defines a downlink wake-up operating mode. When no data is transmitted between an access point (AP) and a station (STA), the STA is in a sleep mode. The AP may generate a wake-up signal in a multicarrier on-off keying (MC-OOK) manner.

However, an existing cellular system does not support generating an ASK signal. An OOK wake-up signal waveform generated by the WLAN AP in the MC-OOK modulation scheme has a large envelope ripple, and is unfavorable for a wake-up receiver of the STA to demodulate. In addition, the wake-up signal waveform occupies a large bandwidth in frequency domain, resulting in low spectral efficiency and large out-of-band spurious emission.

SUMMARY

This application provides a signal transmission method and an apparatus, to reduce an envelope ripple of a transmission signal.

According to a first aspect, a signal transmission method is provided. The method may be executed by a base station, or may be executed by an apparatus with a function similar to that of a base station. In the method, the base station may obtain a first bit sequence, and map the first bit sequence to a first modulation symbol sequence. A value of each modulation symbol in the first modulation symbol sequence belongs to a first constellation point set, and the first constellation point set includes K modulation symbols. Each of the K modulation symbols has a different amplitude. $K \geq 2$, and K is an integer. The base station may perform a discrete Fourier transform (DFT) on each modulation symbol in the first modulation symbol sequence to obtain a second modulation symbol sequence, and then perform weighting on the second modulation symbol sequence to obtain a third modulation symbol sequence. The base station may perform an inverse discrete Fourier transform (IFFT) on the third modulation symbol sequence to obtain a first signal. The base station may send a second signal, where the second signal includes the first signal.

Based on the foregoing solution, an envelope ripple of the signal generated by the base station in time domain is small. This facilitates demodulation of the transmission signal by a terminal.

In a possible implementation, each of the K modulation symbols has a different amplitude and each of the K modulation symbols has a same phase. Alternatively, each of the K modulation symbols has a different amplitude and each of the K modulation symbols has a different phase.

Based on the foregoing solution, when each modulation symbol has a different amplitude and a same phase, the base station may generate an ASK signal; and when each modulation symbol has a different amplitude and a different phase, the base station may generate an amplitude and phase-shift keying (APSK) signal.

In a possible implementation, the base station may obtain an original bit sequence, and perform line encoding on the original bit sequence to obtain an encoded bit sequence. The base station may perform a bit repetition operation on the encoded bit sequence to obtain the first bit sequence. The base station may optimize a characteristic of a data bit waveform through line encoding. This facilitates demodulation of a downlink signal by the terminal. The base station may implement an adjustment function of a transmission rate by using the bit repetition operation.

In a possible implementation, the second signal includes a plurality of orthogonal frequency division multiplexing (OFDM) symbols. The first signal is one of the plurality of OFDM symbols. Guard interval data is included before each OFDM symbol in the second signal. The guard interval data before the first signal includes one of the following: N pieces of data or N zeros from front to back in the first signal, where N is a positive integer.

Based on the foregoing implementation, the guard interval data may exist between each first signal, and the guard interval data has a small impact on the envelope ripple of the transmission signal.

In a possible implementation, the K modulation symbols are K points in any one of the following constellation diagrams: a 16 quadrature amplitude modulation (QAM) constellation diagram, a 64QAM constellation diagram, a 256QAM constellation diagram, a 1024QAM constellation diagram, a 4096QAM constellation diagram, or an APSK constellation diagram. Modulation symbol mapping using the constellation points in the constellation diagram can be compatible with a modulation scheme of an existing cellular system.

In a possible implementation, a weighting coefficient may be one of the following: a coefficient of a raised cosine filter, a coefficient of a square-root raised cosine filter, a coefficient of a sine filter, or a coefficient of a brick-wall filter. An envelope ripple of the ASK signal can be reduced by performing weighting on data on which a DFT is performed.

In a possible implementation, K=2.

In a possible implementation, the base station may obtain a second bit sequence, and map the second bit sequence to a fourth modulation symbol sequence. A value of each modulation symbol in the fourth modulation symbol sequence belongs to a second constellation point set, and the second constellation point set includes a third modulation symbol and a fourth modulation symbol. An amplitude of the third modulation symbol is different from an amplitude of the fourth modulation symbol. A ratio of the amplitude of the third modulation symbol to the amplitude of the fourth modulation symbol is different from a ratio of an amplitude of a first modulation symbol to an amplitude of a second modulation symbol. The base station may perform a discrete Fourier transform DFT on each modulation symbol in the fourth modulation symbol sequence to obtain a fifth modulation symbol sequence, and then perform weighting on the fifth modulation symbol sequence to obtain a sixth modulation symbol sequence. The base station may perform an inverse discrete Fourier transform IFFT on the sixth modulation symbol sequence to obtain a third signal. The base station may send the third signal. The base station may select different constellation points in the constellation diagram to generate transmission signals with different modulation depths, and flexibly allocate the power between useful signal strength and carrier power, thereby meeting different requirements for high charging power and high signal power.

According to a second aspect, a communication apparatus is provided. The communication apparatus includes a processing unit and a transceiver unit.

The processing unit is configured to obtain a first bit sequence, and map the first bit sequence to a first modulation symbol sequence. A value of each modulation symbol in the first modulation symbol sequence belongs to a first constellation point set, and the first constellation point set includes K modulation symbols. Each of the K modulation symbols has a different amplitude. K≥2 and K is an integer. The processing unit is further configured to: perform a discrete Fourier transform DFT on each modulation symbol in the first modulation symbol sequence to obtain a second modulation symbol sequence, perform weighting on the second modulation symbol sequence to obtain a third modulation symbol sequence, and then perform an inverse discrete Fourier transform IFFT on the third modulation symbol sequence to obtain a first signal. The transceiver unit is configured to send a second signal, where the second signal includes the first signal.

In a design, each of the K modulation symbols has a different amplitude and each of the K modulation symbols has a same phase. Alternatively, each of the K modulation symbols has a different amplitude and each of the K modulation symbols has a different phase.

In a design, when obtaining the first bit sequence, the processing unit is specifically configured to obtain an original bit sequence, perform line encoding on the original bit sequence to obtain an encoded bit sequence, and then perform a bit repetition operation on the encoded bit sequence to obtain the first bit sequence.

In a design, the second signal includes a plurality of orthogonal frequency division multiplexing OFDM symbols, and the first signal is one of the plurality of OFDM symbols. Guard interval data is included before each OFDM symbol in the second signal. The guard interval data before the first signal includes one of the following: N pieces of data or N zeros from front to back in the first signal, where N is a positive integer.

In a design, the K modulation symbols are K points in any one of the following constellation diagrams: a 16 quadrature amplitude modulation QAM constellation diagram, a 64QAM constellation diagram, a 256QAM constellation diagram, a 1024QAM constellation diagram, a 4096QAM constellation diagram, or an amplitude and phase-shift keying APSK constellation diagram.

In a design, K=2.

In a design, the first constellation point set includes a first modulation symbol and a second modulation symbol. The processing unit is further configured to obtain a second bit sequence, and map the second bit sequence to a fourth modulation symbol sequence. A value of each modulation symbol in the fourth modulation symbol sequence belongs to a second constellation point set, and the second constellation point set includes a third modulation symbol and a fourth modulation symbol. An amplitude of the third modulation symbol is different from an amplitude of the fourth modulation symbol. A ratio of the amplitude of the third modulation symbol to the amplitude of the fourth modulation symbol is different from a ratio of an amplitude of the first modulation symbol to an amplitude of the second modulation symbol. The processing unit is further configured to perform a discrete Fourier transform DFT on each modulation symbol in the fourth modulation symbol sequence to obtain a fifth modulation symbol sequence, perform weighting on the fifth modulation symbol sequence to obtain a sixth modulation symbol sequence, and then perform an inverse discrete Fourier transform IFFT on the sixth modulation symbol sequence to obtain a third signal. The transceiver unit is further configured to send the third signal.

According to a third aspect, a communication apparatus is provided. The communication apparatus includes a processor. The processor is coupled to a memory. The memory is configured to store a computer program or instructions. The processor is configured to execute the computer program or the instructions, to implement the method according to the possible implementations of the foregoing aspects. The memory may be located inside or outside the apparatus. There are one or more processors.

According to a fourth aspect, this application provides a communication apparatus, including a processor and an interface circuit. The interface circuit is configured to communicate with another apparatus. The processor is configured to implement the method according to the possible implementations of the foregoing aspects.

According to a fifth aspect, a communication apparatus is provided. The apparatus includes a logic circuit and an input/output interface.

In an example, the logic circuit is configured to: map a first bit sequence to a first modulation symbol sequence, where a value of each modulation symbol in the first modulation symbol sequence belongs to a first constellation point set, the first constellation point set includes K modulation symbols, each of the K modulation symbols has a different amplitude, each of the K modulation symbol has a same phase, K≥2, and K is an integer; perform a DFT on each modulation symbol in the first modulation symbol sequence to obtain a second modulation symbol sequence; perform weighting on the second modulation symbol sequence to obtain a third modulation symbol sequence; and perform an IFFT on the third modulation symbol sequence to obtain a first signal. The input/output interface is configured to output a second signal, where the second signal includes the first signal. For more detailed descriptions of the solution, refer to the foregoing related descriptions of the first aspect.

According to a sixth aspect, this application further provides a chip system, including a processor, configured to perform the method according to the possible implementations of the foregoing aspects.

According to a seventh aspect, this application further provides a computer program product, including computer-executable instructions. When a communication apparatus executes the instructions on a computer, the method according to the possible implementations of the foregoing aspects is performed.

According to an eighth aspect, this application further provides a computer-readable storage medium. The computer-readable storage medium stores a computer program or instructions. When the instructions are run on a communication apparatus, the method according to the possible implementations of the foregoing aspects is performed.

DESCRIPTION OF EMBODIMENTS

Figure 1:
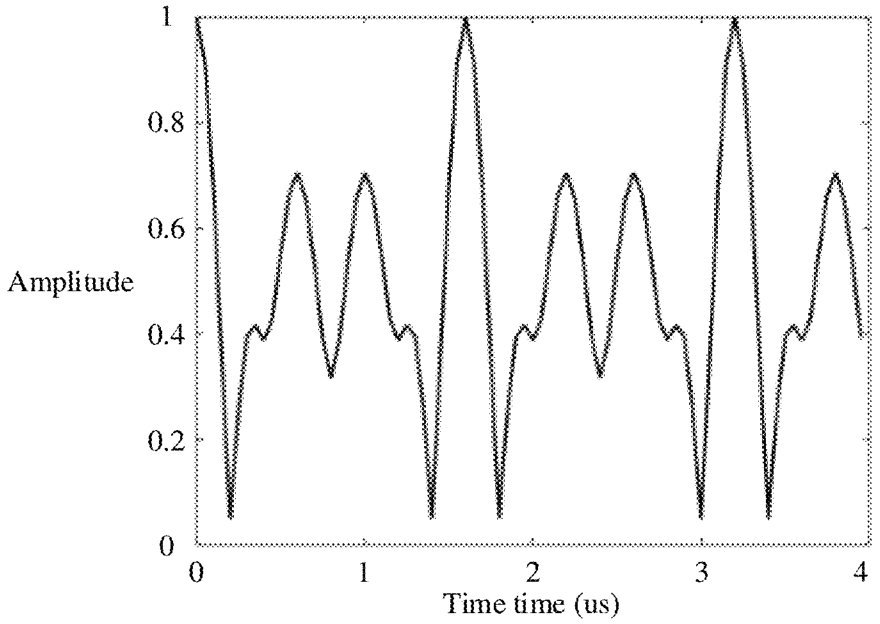
FIG. 1 is a waveform diagram of an On symbol in a conventional technology.

For ease of understanding the technical solutions provided in embodiments of this application, the following explains and describes the technical solutions provided in embodiments of this application with reference to the accompanying drawings.

The WLAN standard 802.11ba defines a downlink wake-up operating mode. When no data is transmitted between an AP and a STA, the STA is in a sleep mode. The AP may generate a wake-up signal in an MC-OOK manner. The STA may encode an information bit by using a wake-up radio (WUR) encoder, and select, based on an encoded bit, a to-be-sent waveform. Specifically, when the encoded bit is 1, an On symbol generated by an on waveform generator (On-WG) is selected for sending. When the encoded bit is 0, an off symbol generated by an off waveform generator (Off-WG) is selected for sending.

The On symbol generated by the On-WG is constructed by using 13 subcarriers in a center of a 64-point inverse discrete Fourier transform (IDFT) with a sampling rate of 20 MHz. Specifically, 12 subcarriers whose subcarrier index numbers are −6, −5, . . . , −1, 1, . . . , 5, and 6 use a non-zero input, and the other subcarrier is set to zero as an input, and then 64-point IDFT processing is performed. After data output after the 64-point IDFT is randomized through symbol randomization, last 16 pieces of data are added before 64 sampling points through inserting a guard interval (GI), to generate 80 sampling points. The Off symbol is all-zero data generated by the Off-WG.

A waveform of an On symbol generated by using a subcarrier reference sequence {−1, 1, 1, 1, −1, 1, 0, −1, −1, −1, 1, −1, −1} defined in 802.11ba is shown in FIG. 1. A waveform envelope of the On symbol in time domain has a large ripple, and occupies a large bandwidth. A single OFDM symbol can transmit only one symbol, resulting in low spectral efficiency and large out-of-band spurious emission. In addition, a rate and a modulation depth of the On symbol are fixed and cannot be adjusted flexibly. However, a conventional ASK or OOK signal is incompatible with an OFDM signal, and an existing long term evolution (LTE) cellular communication system and an existing new radio (NR) cellular communication system cannot generate an ASK signal or an OOK signal with a stable envelope.

Figure 2:
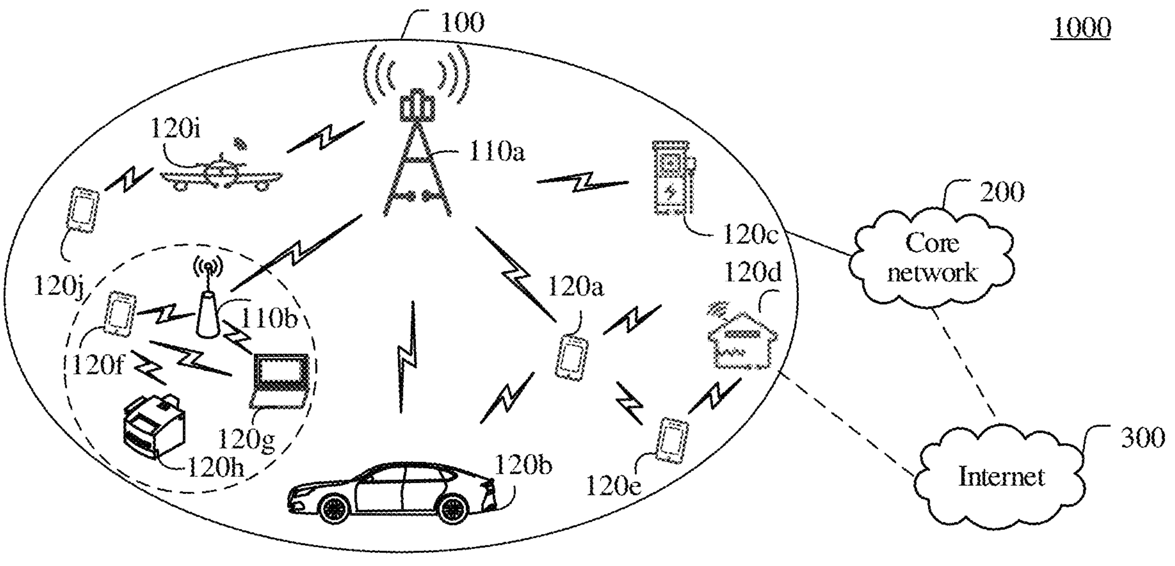
FIG. 2 is a schematic diagram of a communication system according to an embodiment of this application.

FIG. 2 is a schematic architectural diagram of a communication system 1000 to which an embodiment of this application is applied. As shown in FIG. 2, the communication system includes a radio access network 100 and a core network 200. Optionally, the communication system 1000 may further include an internet 300. The radio access network 100 may include at least one radio access network device (for example, 110*a* and 110*b* in FIG. 2), and may further include at least one terminal (for example, 120*a* to 120*j* in FIG. 2). The terminal is connected to the radio access network device in a wireless manner. The radio access network device is connected to the core network in a wireless or wired manner. A core network device and the radio access network device may be independent and different physical devices, or functions of the core network device and logical functions of the radio access network device may be integrated into a same physical device, or some functions of the core network device and some functions of the radio access network device may be integrated into one physical device. A wired or wireless manner may be used for connection between terminals and between radio access network devices. FIG. 2 is merely a schematic diagram. The communication system may further include another network device, for example, may further include a wireless relay device and a wireless backhaul device which are not shown in FIG. 2.

The radio access network device may also be referred to as a network device. The radio access network device may be a base station, an evolved NodeB (eNodeB), a transmission reception point (TRP), a next generation NodeB (gNB) in a 5th generation (5G) mobile communication system, a next generation NodeB in a 6th generation (6G) mobile communication system, a base station in a future mobile communication system, an access node in a Wi-Fi system, or the like. The radio access network device may alternatively be a module or unit that implements some functions of the base station, for example, may be a central unit (CU), or may be a distributed unit (DU). The CU implements functions of a radio resource control protocol and a packet data convergence protocol (PDCP) of the base station, and may further implement a function of a service data adaptation protocol (SDAP). The DU implements functions of a radio link control layer and a medium access control (MAC) layer of the base station, and may further implement functions of some or all physical layers. For specific descriptions of the foregoing protocol layers, refer to related technical specifications of the 3rd generation partnership project (3GPP). The radio access network device may be a macro base station (for example, 110*a* in FIG. 2), or may be a micro base station or an indoor station (for example, 110*b* in FIG. 2), or may be a relay node, a donor node, or the like. A specific technology and a specific device form used by the radio access network device are not limited in embodiments of this application. For ease of description, the following uses an example in which the base station is used as the radio access network device for description.

The terminal may also be referred to as a terminal device, user equipment (UE), a mobile station, a mobile terminal, or the like. The terminal may be widely used in various scenarios, for example, a device-to-device (D2D) scenario, a vehicle-to-everything (V2X) communication scenario, a machine-type communication (MTC) scenario, an internet-of-things (IOT) scenario, a virtual reality scenario, an augmented reality scenario, an industrial control scenario, an automatic driving scenario, a telemedicine scenario, a smart grid scenario, a smart furniture scenario, a smart office scenario, a smart wearable scenario, a smart transportation scenario, and a smart city scenario. The terminal may be a mobile phone, a tablet computer, a computer with a wireless transceiver function, a wearable device, a vehicle, an uncrewed aerial vehicle, a helicopter, an aircraft, a ship, a robot, a robot arm, a smart home device, or the like. A specific technology and a specific device form used by the terminal are not limited in embodiments of this application.

The base station and the terminal may be at fixed locations, or may be movable. The base station and the terminal may be deployed on land, including an indoor device, an outdoor device, a handheld device, or a vehicle-mounted device; may be deployed on water; or may be deployed on an aircraft, a balloon, and an artificial satellite in the air. Application scenarios of the base station and the terminal are not limited in embodiments of this application.

Roles of the base station and the terminal may be relative. For example, a helicopter or an uncrewed aerial vehicle 120*i* in FIG. 2 may be configured as a mobile base station. For a terminal 120*j* accessing the radio access network 100 by using 120*i*, the terminal 120*i* is the base station. However, for a base station 110*a*, 120*i* is the terminal. In other words, 110*a* and 120*i* communicate with each other via a wireless air interface protocol. Certainly, 110*a* and 120*i* may alternatively communicate with each other via an interface protocol between base stations. In this case, for 110*a*, 120*i* is also the base station. Therefore, both the base station and the terminal may be collectively referred to as communication apparatuses. 110*a* and 110*b* in FIG. 2 may be referred to as communication apparatuses having a base station function, and 120*a* to 120*j* in FIG. 2 may be referred to as communication apparatuses having a terminal function.

Communication between the base station and the terminal, between the base stations, and between the terminals may be performed through a licensed spectrum, or may be performed through an unlicensed spectrum, or may be performed through both the licensed spectrum and the unlicensed spectrum. Communication may be performed through a spectrum below 6 gigahertz (GHz), or may be performed through a spectrum above 6 GHz, or may be performed through both the spectrum below 6 GHz and the spectrum above 6 GHz. A spectrum resource used for wireless communication is not limited in embodiments of this application.

In embodiments of this application, a function of the base station may be performed by a module (for example, a chip) in the base station, or may be performed by a control subsystem including the function of the base station. The control subsystem including the function of the base station herein may be a control center in the foregoing application scenarios, such as the smart grid scenario, the industrial control scenario, the smart transportation scenario, and the smart city scenario. A function of the terminal may alternatively be performed by a module (for example, a chip or a modem) in the terminal, or may be performed by an apparatus including the function of the terminal.

In this application, the base station sends a downlink signal or downlink information to the terminal, where the downlink information is carried on a downlink channel. The terminal sends an uplink signal or uplink information to the base station, where the uplink information is carried on an uplink channel. To communicate with the base station, the terminal needs to establish a wireless connection to a cell controlled by the base station. The cell that establishes a wireless connection to the terminal is referred to as a serving cell of the terminal. When communicating with the serving cell, the terminal is further interfered by a signal from a neighboring cell.

In this application, a signal may include a data channel, a control channel, and a reference signal. Transmission of a signal may be uplink transmission, that is, the terminal sends the signal to the base station; or may be downlink transmission, that is, the base station sends the signal to the terminal. When transmitting is used as a verb, transmitting may be interchanged with sending and/or receiving.

For ease of understanding the technical solutions in embodiments of this application, the following explains and describes technical terms in embodiments of this application.

(1) Line encoding is used to eliminate or reduce a direct current and low-frequency components in a digital electrical signal for ease of transmission, reception, and monitoring in a wired/wireless channel.

(2) A modulation symbol sequence may be a sequence including one or more modulation symbols.

(3) A modulation depth is defined as $D=(A-B)/A$. A represents a maximum envelope value of a signal, and B represents a minimum envelope value of the signal.

Figure 3:
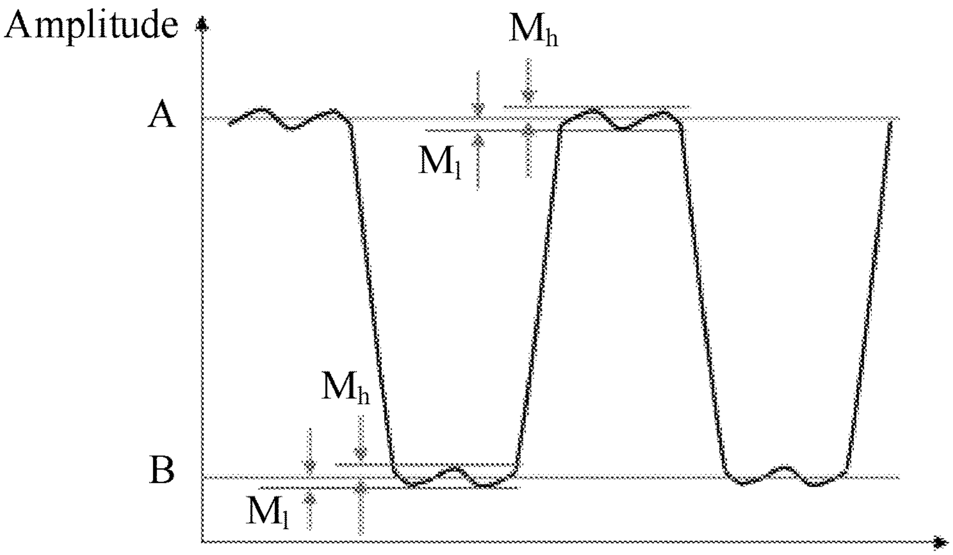
FIG. 3 is a waveform diagram of a signal according to an embodiment of this application.

(4) An envelope ripple represents amplitude fluctuations $M_h$ and $M_l$ of a radio frequency signal envelope at a high level or a low level, as shown in FIG. 3. $M_h$ represents a magnitude of an upward fluctuation of an amplitude, and $M_l$ represents a magnitude of a downward fluctuation of the amplitude.

Figure 4:
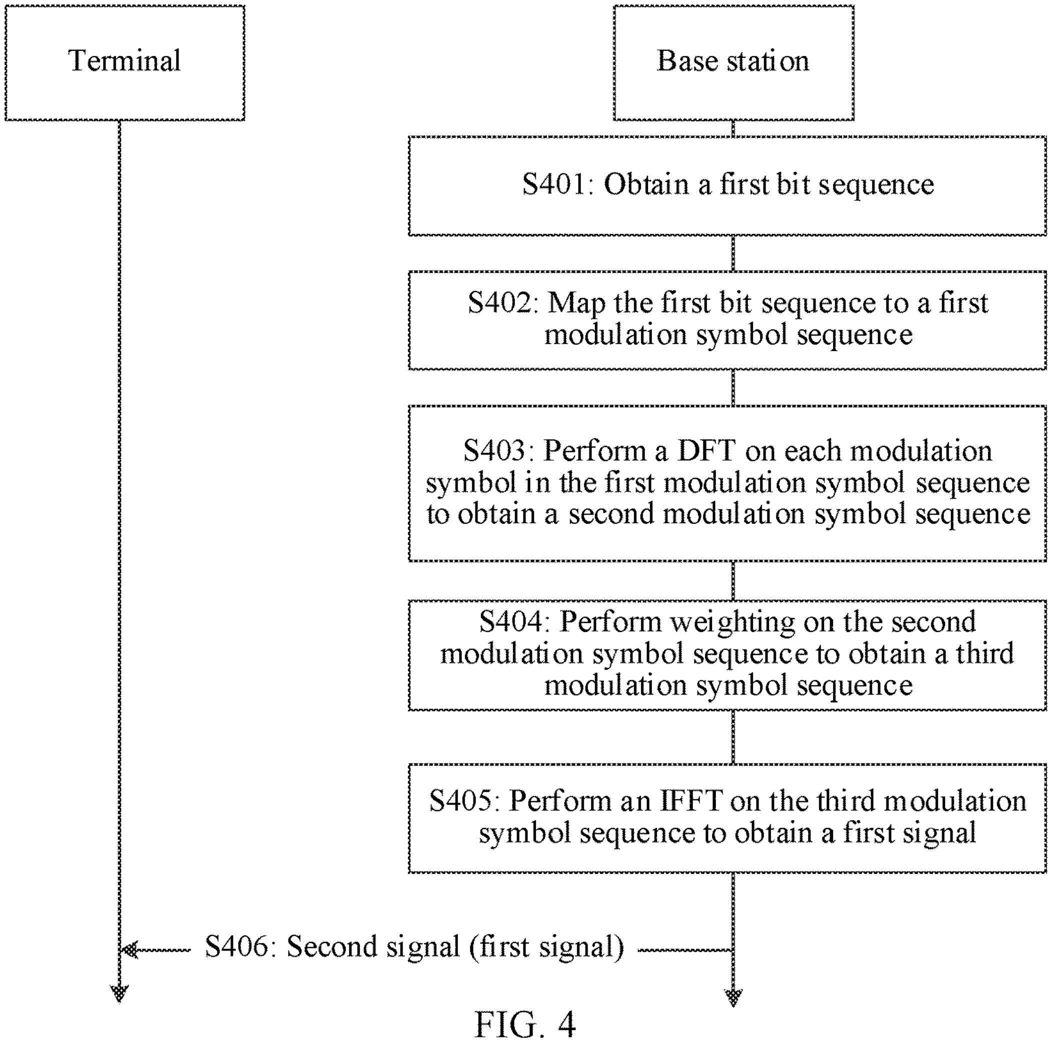
FIG. 4 is an example flowchart of a signal transmission method according to an embodiment of this application.

FIG. 4 is an example flowchart of a signal transmission method according to an embodiment of this application. In embodiments of this application, the signal transmission method provided in this application is described by using a base station and a terminal as execution bodies. It may be understood that the transmission method provided in this application may also be performed by an apparatus used in a base station or an apparatus used in a terminal, for example, a chip. The method may include the following operations.

S401: The base station obtains a first bit sequence.

In an example, the first bit sequence may be an original bit sequence.

In another example, the first bit sequence may be obtained by performing line encoding and a bit repetition operation on an original bit sequence. For example, the base station may generate the original bit sequence, and perform line encoding on the original bit sequence. For example, Manchester encoding and pulse interval encoding (PIE) may be performed on the original bit sequence to obtain an encoded bit sequence.

The base station may perform a bit repetition operation on the encoded bit sequence. When the bit repetition operation is performed on the encoded bit sequence, a quantity of repetitions of a bit 1 may be the same as a quantity of repetitions of a bit 0, or a quantity of repetitions of a bit 1 may be different from a quantity of repetitions of a bit 0. The quantities of repetitions of the bit 1 and the bit 0 may be predefined by the base station.

The following uses an example in which the original bit sequence is "01101010" for description. The base station may perform PIE encoding on the original bit sequence. To be specific, the bit "0" is encoded into a bit sequence "10", and the bit "1" is encoded into a bit sequence "1110". After the foregoing PIE encoding is performed, an obtained encoded bit sequence is "10111011101011101011101 0". It is assumed that the quantities of repetitions of the bit "0" and the bit "1" are predefined as 2. In other words, "0" in the encoded bit sequence is repeated as "00", and "1" in the encoded bit sequence is repeated as "11". Therefore, after a bit repetition operation is performed on the encoded bit sequence, an obtained first bit sequence may be "110011111100111111001100111111001100111111001100".

Based on the foregoing bit repetition operation, the base station may implement an adjustment function of a transmission rate based on the bit repetition operation, and may flexibly adjust a transmission rate of a signal.

S402: The base station maps the first bit sequence to a first modulation symbol sequence.

When mapping the first bit sequence to the first modulation symbol sequence, the base station may perform mapping based on points included in a first constellation point set. In other words, a value of each modulation symbol in the first modulation symbol sequence belongs to the first constellation point set. The first constellation point set may include K modulation symbols, and each of the K modulation symbols has a different amplitude. K≥2, and K is an integer.

Figure 5A:
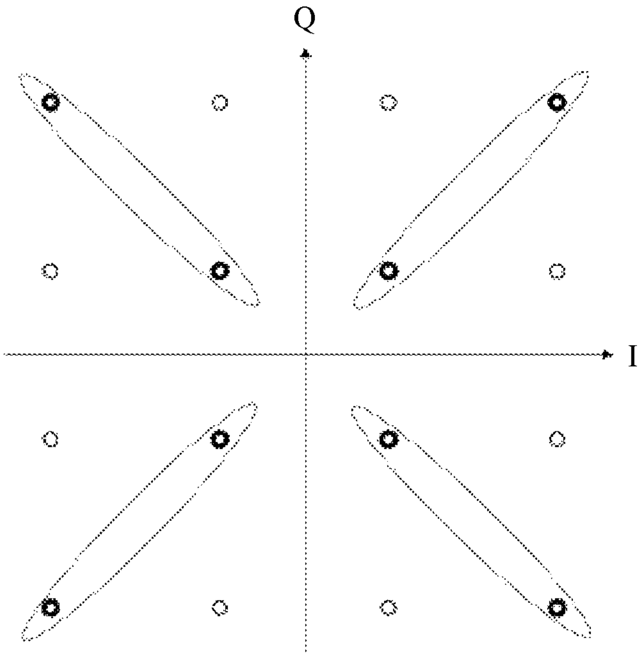
FIG. 5A is a 16QAM constellation diagram according to an embodiment of this application.
Figure 5B:
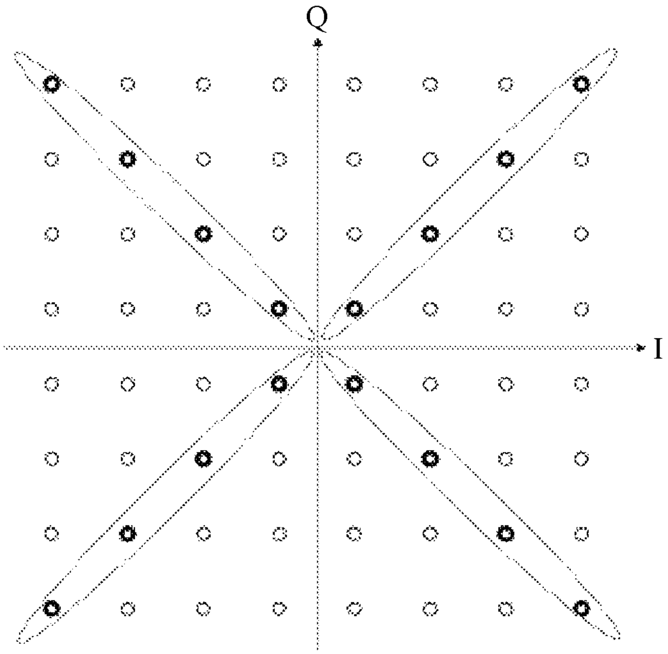
FIG. 5B is a 64QAM constellation diagram according to an embodiment of this application.
Figure 5C:
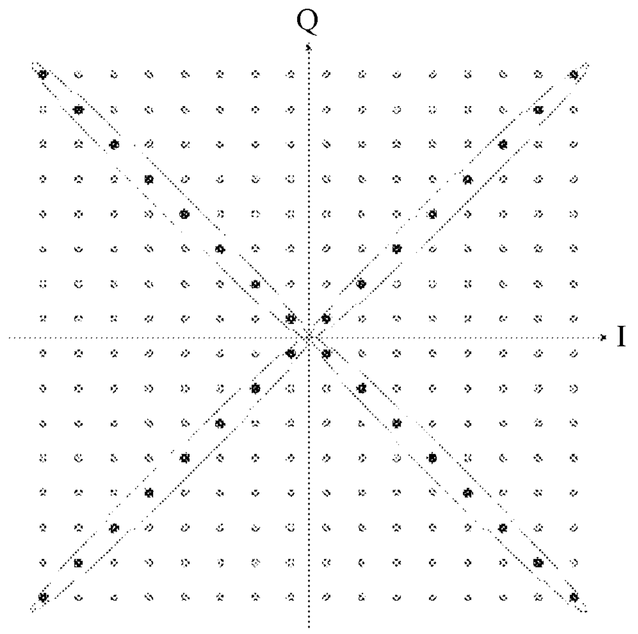
FIG. 5C is a 256QAM constellation diagram according to an embodiment of this application.

In this embodiment of this application, the first constellation point set may be K points in a constellation diagram, for example, may be K points in an ASK constellation diagram, a 16QAM constellation diagram, a 64QAM constellation diagram, a 256QAM constellation diagram, a 1024QAM constellation diagram, a 4096QAM constellation diagram, or an APSK constellation diagram. The 16QAM constellation diagram, the 64QAM constellation diagram, and the 256QAM constellation diagram are shown in FIG. 5A to FIG. 5C.

In an example, each of the K modulation symbols has a same phase. FIG. 5A is a schematic diagram of 16QAM constellation points according to an embodiment of this application. FIG. 5B is a schematic diagram of 64QAM constellation points according to an embodiment of this application. FIG. 5C is a schematic diagram of 256QAM constellation points according to an embodiment of this application. In any constellation diagram shown in FIG. 5A to FIG. 5C, a horizontal coordinate is a real part, and a vertical coordinate is an imaginary part. In any constellation diagram shown in FIG. 5A to FIG. 5C, constellation points within an ellipse in any quadrant have a same phase. The first constellation point set may include two points within an ellipse in the first quadrant, the second quadrant, the third quadrant, or the fourth quadrant shown in FIG. 5A. Alternatively, the first constellation point set may include two to four points within an ellipse in the first quadrant, the second quadrant, the third quadrant, or the fourth quadrant shown in FIG. 5B. Alternatively, the first constellation point set may include two to eight points within an ellipse in the first quadrant, the second quadrant, the third quadrant, or the fourth quadrant shown in FIG. 5C. When each constellation point in the first constellation point set has a different amplitude and a same phase, the base station may generate an ASK signal.

In another example, each of the K modulation symbols has a different phase. The first constellation point set may be K points in any constellation diagram shown in FIG. 5A to FIG. 5C. Any two of the K points cannot be constellation points within an ellipse in a same quadrant. When the constellation points in the first constellation point set have different amplitudes and different phases, the base station may generate an APSK signal.

The base station may map the first bit sequence to the first modulation symbol sequence by using the first constellation point set in any one of the foregoing constellation diagrams.

The following uses an example in which each modulation symbol included in the first constellation point set has a different amplitude and a same phase for description. It is assumed that the first constellation point set includes a point with a largest amplitude and a point with a smallest amplitude within an ellipse in the first quadrant in the 256QAM constellation diagram. The bit "0" may be mapped to the point with a smallest amplitude, and the bit "1" may be mapped to the point with a largest amplitude.

According to the 256QAM constellation diagram, the base station may first map one bit to eight bits based on the first constellation point set. The bit "0" is mapped to "00001111", and the bit "1" is mapped to "00111111". Specifically, the first bit sequence "11001111110011111100110011111100110011111 1001100" may be mapped to "0011111100111111000011110000111100111111100111111001111110011111100111111001111100 00111100001111001111110011111100111111001111110011111100111111000011110000111100111 11100111111000011110000111100111111001111110011111100111111001111110011111100111111 00001111 0000111100111111001111110001111000011110011111100111111001111110011111100111111001 11111001 1111100001111000011110011111100111110000111100001111" by using the first constellation point set.

After mapping one bit to eight bits, the base station may map the foregoing bit sequence to the first modulation symbol sequence by using the following formula (1):

$$d(i) = \frac{1}{\sqrt{170}}\{(1-2b(8i))[8-(1-2b(bi+2))[4-1(2b(8i+4))[2-(1-2b(8i+6))]]]+j(1-2b(8i+1))[8-(1-2b(bi+3))[4-1-2b(8i+5))[2-(1-2b(8i+7))]]]\} \quad \text{Formula (1)}$$

In the foregoing formula (1), d(i) represents a modulation symbol, j is a complex number unit, b(8i) is the first bit in an $i^{th}$ group of eight bits in the first bit sequence, b(8i+1) is the second bit in the $i^{th}$ group of eight bits in the first bit sequence, b(8i+2) is the third bit in the $i^{th}$ group of eight bits in the first bit sequence, b(8i+3) is the fourth bit in the $i^{th}$ group of eight bits in the first bit sequence, b(8i+4) is the fifth bit in the $i^{th}$ group of eight bits in the first bit sequence, b(8i+5) is the sixth bit in the $i^{th}$ group of eight bits in the first bit sequence, b(8i+6) is the seventh bit in the $i^{th}$ group of eight bits in the first bit sequence, and b(8i+7) is the eighth bit in the $i^{th}$ group of eight bits in the first bit sequence.

Therefore, after the base station maps the first bit sequence by using the first constellation point set, "00001111" is mapped to a complex number $$\frac{1}{\sqrt{170}}(1+j),$$

and "00111111" is mapped to a complex number $$\frac{15}{\sqrt{170}}(1+j).$$

The base station may map the first bit sequence "11001111110011111100110011111100110011111001100" to a first modulation symbol sequence $$\text{“}\frac{15}{\sqrt{170}}(1+j), \frac{15}{\sqrt{170}}(1+j), \frac{1}{\sqrt{170}}(1+j), \frac{1}{\sqrt{170}}(1+j), \frac{15}{\sqrt{170}}(1+j),$$

$$\frac{15}{\sqrt{170}}(1+j), \frac{15}{\sqrt{170}}(1+j), \frac{15}{\sqrt{170}}(1+j), \frac{15}{\sqrt{170}}(1+j), \frac{15}{\sqrt{170}}(1+j),$$

$$\frac{1}{\sqrt{170}}(1+j), \frac{1}{\sqrt{170}}(1+j), \frac{15}{\sqrt{170}}(1+j), \frac{15}{\sqrt{170}}(1+j), \frac{15}{\sqrt{170}}(1+j),$$

$$\frac{15}{\sqrt{170}}(1+j), \frac{15}{\sqrt{170}}(1+j), \frac{15}{\sqrt{170}}(1+j), \frac{1}{\sqrt{170}}(1+j), \frac{1}{\sqrt{170}}(1+j),$$

$$\frac{15}{\sqrt{170}}(1+j), \frac{15}{\sqrt{170}}(1+j), \frac{1}{\sqrt{170}}(1+j), \frac{1}{\sqrt{170}}(1+j), \frac{15}{\sqrt{170}}(1+j),$$

$$\frac{15}{\sqrt{170}}(1+j), \frac{15}{\sqrt{170}}(1+j), \frac{15}{\sqrt{170}}(1+j), \frac{15}{\sqrt{170}}(1+j), \frac{15}{\sqrt{170}}(1+j),$$

$$\frac{1}{\sqrt{170}}(1+j), \frac{1}{\sqrt{170}}(1+j), \frac{15}{\sqrt{170}}(1+j), \frac{15}{\sqrt{170}}(1+j), \frac{1}{\sqrt{170}}(1+j),$$

$$\frac{1}{\sqrt{170}}(1+j), \frac{15}{\sqrt{170}}(1+j), \frac{15}{\sqrt{170}}(1+j), \frac{15}{\sqrt{170}}(1+j), \frac{15}{\sqrt{170}}(1+j),$$

-continued $$\frac{15}{\sqrt{170}}(1+j), \frac{15}{\sqrt{170}}(1+j), \frac{1}{\sqrt{170}}(1+j), \frac{1}{\sqrt{170}}(1+j),$$

$$\frac{15}{\sqrt{170}}(1+j), \frac{15}{\sqrt{170}}(1+j), \frac{1}{\sqrt{170}}(1+j), \frac{1}{\sqrt{170}}(1+j)\text{”}$$

by using the two points in the 256QAM constellation diagram.

Figure 5D:
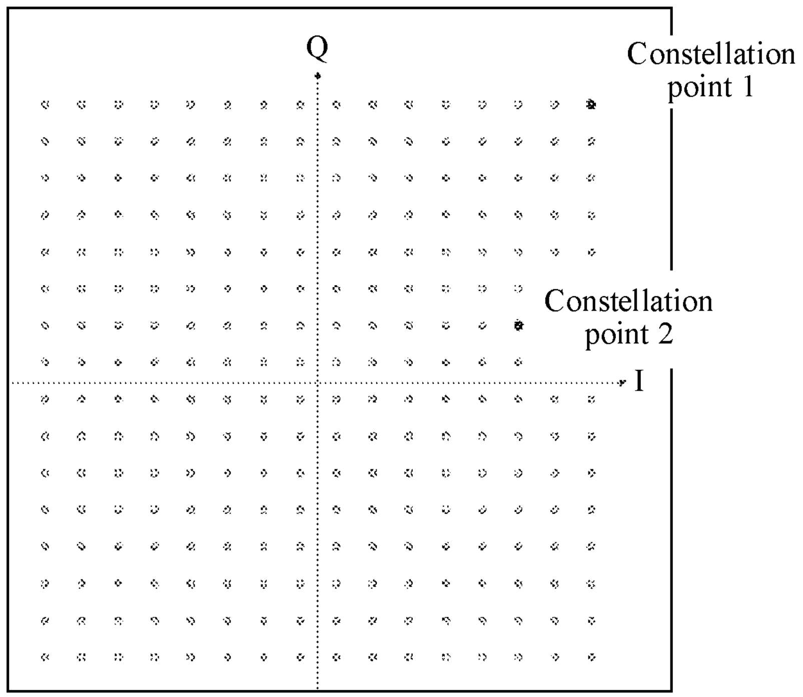
FIG. 5D is a schematic diagram of a first constellation set according to an embodiment of this application.

The following uses an example in which each modulation symbol included in the first constellation point set has a different amplitude and a different phase for description. Refer to FIG. 5D. It is assumed that the first constellation point set includes two constellation points shown in FIG. 5D: a constellation point 1 and a constellation point 2. The bit "0" may be mapped to the constellation point 1, and the bit "1" may be mapped to the constellation point 2.

According to the constellation diagram shown in FIG. 5D, the base station may first map one bit to eight bits based on the first constellation point set. The bit "0" is mapped to "00110110", and the bit "1" is mapped to "00111111". Specifically, the first bit sequence "110011111100111-1110011001111110011001111111001100" may be mapped to "0011111100111111001101100011011000111111100111111-100111111001111110011111100111111100 11011000110-1100011111100111111001111110011111100111111001111-1100110110001101100011 1110011111100110110001101-1000111111001111110011111100111111001111110011111-100110110 001101100011111100111111001101100011111-10011111110011111100111111001111110011111001 1011000110110001111110011111100110110001101110" by using the first constellation point set.

After mapping one bit to eight bits, the base station may map the foregoing bit sequence to the first modulation symbol sequence by using the foregoing formula (1). Based on the foregoing formula (1), "00110110" is mapped to a complex number $$\frac{1}{\sqrt{170}}(11+3j),$$

and "00111111" is mapped to $$\frac{15}{\sqrt{170}}(1+j).$$

The base station may map the first bit sequence to a first modulation symbol sequence $$\text{“}\frac{15}{\sqrt{170}}(1+j), \frac{15}{\sqrt{170}}(1+j), \frac{1}{\sqrt{170}}(11+3j), \frac{1}{\sqrt{170}}(11+3j),$$

$$\frac{15}{\sqrt{170}}(1+j), \frac{15}{\sqrt{170}}(1+j), \frac{15}{\sqrt{170}}(1+j), \frac{15}{\sqrt{170}}(1+j), \frac{15}{\sqrt{170}}(1+j),$$

$$\frac{15}{\sqrt{170}}(1+j), \frac{1}{\sqrt{170}}(11+3j), \frac{1}{\sqrt{170}}(11+3j), \frac{15}{\sqrt{170}}(1+j),$$

$$\frac{15}{\sqrt{170}}(1+j), \frac{15}{\sqrt{170}}(1+j), \frac{15}{\sqrt{170}}(1+j), \frac{15}{\sqrt{170}}(1+j), \frac{15}{\sqrt{170}}(1+j),$$

$$\frac{1}{\sqrt{170}}(11+3j), \frac{1}{\sqrt{170}}(11+3j), \frac{15}{\sqrt{170}}(1+j), \frac{15}{\sqrt{170}}(1+j),$$

$$\frac{1}{\sqrt{170}}(11+3j), \frac{1}{\sqrt{170}}(11+3j), \frac{15}{\sqrt{170}}(1+j), \frac{15}{\sqrt{170}}(1+j),$$

-continued $$\frac{15}{\sqrt{170}}(1+j),\ \frac{15}{\sqrt{170}}(1+j),\ \frac{15}{\sqrt{170}}(1+j),\ \frac{15}{\sqrt{170}}(1+j),\ \frac{1}{\sqrt{170}}(11+3j),$$

$$\frac{1}{\sqrt{170}}(11+3j),\ \frac{15}{\sqrt{170}}(1+j),\ \frac{15}{\sqrt{170}}(1+j),\ \frac{1}{\sqrt{170}}(11+3j),$$

$$\frac{1}{\sqrt{170}}(11+3j),\ \frac{15}{\sqrt{170}}(1+j),\ \frac{15}{\sqrt{170}}(1+j),\ \frac{15}{\sqrt{170}}(1+j),\ \frac{15}{\sqrt{170}}(1+j),$$

$$\frac{15}{\sqrt{170}}(1+j),\ \frac{15}{\sqrt{170}}(1+j),\ \frac{1}{\sqrt{170}}(11+3j),\ \frac{1}{\sqrt{170}}(11+3j),$$

$$\frac{15}{\sqrt{170}}(1+j),\ \frac{15}{\sqrt{170}}(1+j),\ \frac{1}{\sqrt{170}}(11+3j),\ \frac{1}{\sqrt{170}}(11+3j)\text{''}$$

by using the constellation point 1 and the constellation point 2 in the constellation diagram shown in FIG. 5D.

S403: The base station performs a DFT on each modulation symbol in the first modulation symbol sequence to obtain a second modulation symbol sequence.

A quantity of DFT points may be 12, 24, 36, or the like. This is not specifically limited in this application. Optionally, the base station may determine the quantity of DFT points based on a frequency domain resource and a subcarrier spacing that can be occupied. Specifically, a 4G or 5G mobile communication system is used as an example. If the subcarrier spacing is 15 kHz, and a bandwidth of an available frequency domain resource is 180 kHz, 12 subcarriers may be provided to generate an ASK signal. In this case, the quantity of DFT points is 12, which is equal to a quantity of the available subcarriers.

S404: The base station performs frequency domain weighting on the second modulation symbol sequence to obtain a third modulation symbol sequence.

To reduce a ripple of a signal envelope, the base station may perform the frequency domain weighting on the second modulation symbol sequence. A frequency domain weighting coefficient may be a coefficient of a raised cosine filter, a coefficient of a square-root cosine filter, a coefficient of a sinc filter, a coefficient of a brick-wall filter, or the like. This is not specifically limited in this application.

It should be noted that the frequency domain weighting may be understood as multiplying modulation symbols in the second modulation symbol by the frequency domain weighting coefficient.

It is assumed that the base station performs a 12-point DFT on the first modulation symbol sequence. To be specific, the DFT is performed on every group of 12 modulation symbols to obtain the second modulation symbol sequence. The first modulation symbol sequence may be divided into four groups. When the frequency domain weighting is performed, each group of modulation symbols has a same frequency domain weighting coefficient, and the modulation symbols in a group have different frequency domain weighting coefficients. It is assumed that the frequency domain weighting coefficients of the modulation symbols in a group are "0.49987801, 0.64357300, 0.77451606, 0.88324531, 0.95891583, 0.99648732, 1, 0.99648732, 0.95891583, 0.88324531, 0.77451606, and 0.64357300" respectively. The base station may multiply the four groups of modulation symbols by corresponding frequency domain weighting coefficients respectively to obtain a third modulation symbol.

S405: The base station performs an IFFT on a third modulation symbol sequence to obtain a first signal.

When the base station performs the IFFT operation on the third modulation symbol sequence, a quantity of IFFT points may be different from the quantity of DFT points. After obtaining the third modulation symbol, the base station may map the third modulation symbol to the subcarriers respectively.

It should be noted that, when the quantity of IFFT points is greater than the quantity of DFT points, service data in the 4G or 5G communication system may also be mapped to unused subcarriers, so that an ASK signal or an OOK signal and an OFDM signal may be generated simultaneously.

S406: The base station sends a second signal, and a corresponding terminal receives the second signal.

The base station may generate a plurality of OFDM symbols by using S401 to S405, that is, generate a plurality of first signals. The second signal sent by the base station may include a plurality of OFDM symbols, and the first signal is one of the plurality of OFDM symbols.

Based on the foregoing solution, an envelope ripple of the ASK signal generated by the base station in time domain is small, and the signal occupies a small bandwidth, so that high spectral efficiency is achieved. In addition, the technical solutions provided in embodiments of this application may be compatible with a cellular physical layer parameter, and may be applicable to an LTE cellular system and an NR cellular system.

Optionally, guard interval data may be included before each OFDM symbol.

Figure 6:
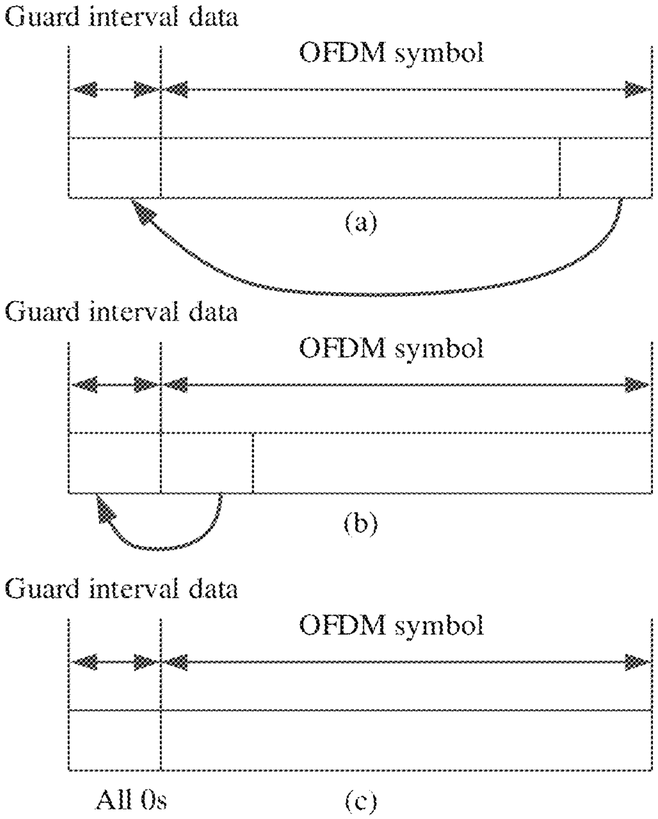
FIG. 6 is a schematic diagram of guard interval data according to an embodiment of this application.

As shown in (a) in FIG. 6, guard interval data before the first signal may be data of N sampling points from back to front in the first signal, namely, a cyclic prefix (cyclic prefix, CP). If the CP is used as the guard interval data, the 4G or 5G communication system may be compatible.

Alternatively, as shown in (b) in FIG. 6, the guard interval data may be N pieces of data from front to back in the first signal, that is, data of first N sampling points in the first signal. Alternatively, as shown in (c) in FIG. 6, the guard interval data may be N zeros. N is a positive integer. N herein is determined or predefined based on an empirical value. This is not specifically limited in this application. If the guard interval data shown in (b) or the guard interval data shown in (c) in FIG. 6 is used, the envelope ripple may be reduced.

In this embodiment of this application, when the original bit sequence is "01101010", and the first constellation point set includes a point with a largest amplitude and a point with a smallest amplitude within an ellipse in the first quadrant in the 256QAM constellation diagram, second signals shown in FIG. 7A to FIG. 7D may be generated.

Figure 7A:
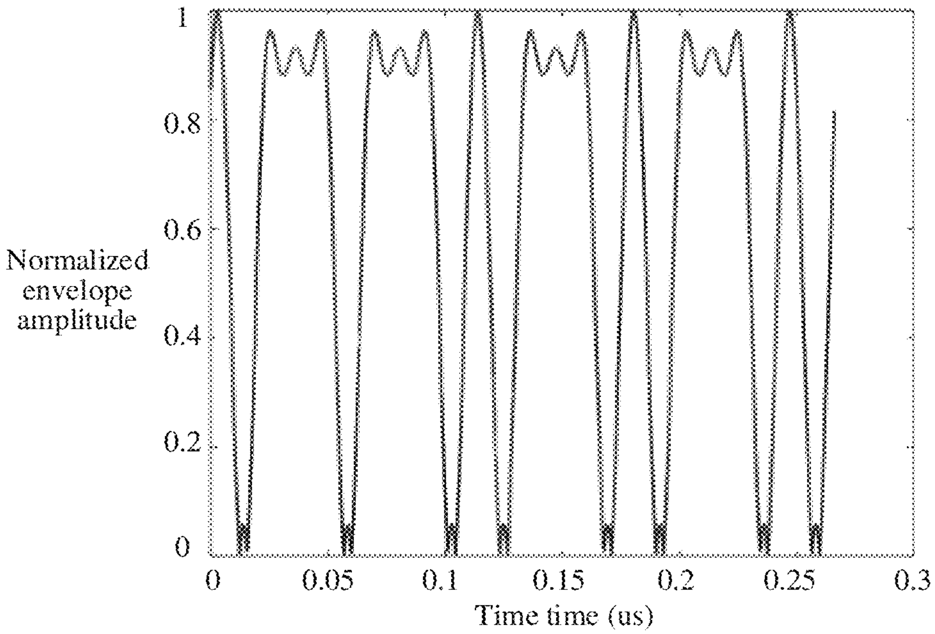
FIG. 7A is a waveform diagram of a second signal without guard interval data according to an embodiment of this application.

FIG. 7A is a schematic diagram of a generated second signal without guard interval data according to an embodiment of this application. An input original bit sequence includes four OFDM symbols, a subcarrier spacing is 15 kHz, and a length of a single OFDM symbol is 66.67 μs. It can be learned from FIG. 7A that, compared with an existing OOK signal (the OOK signal shown in FIG. 1), the second signal generated in this embodiment of this application has a smaller envelope ripple in time domain, and a single OFDM symbol in the second signal includes multi-bit data information, so that higher spectral efficiency is achieved.

Figure 7B:
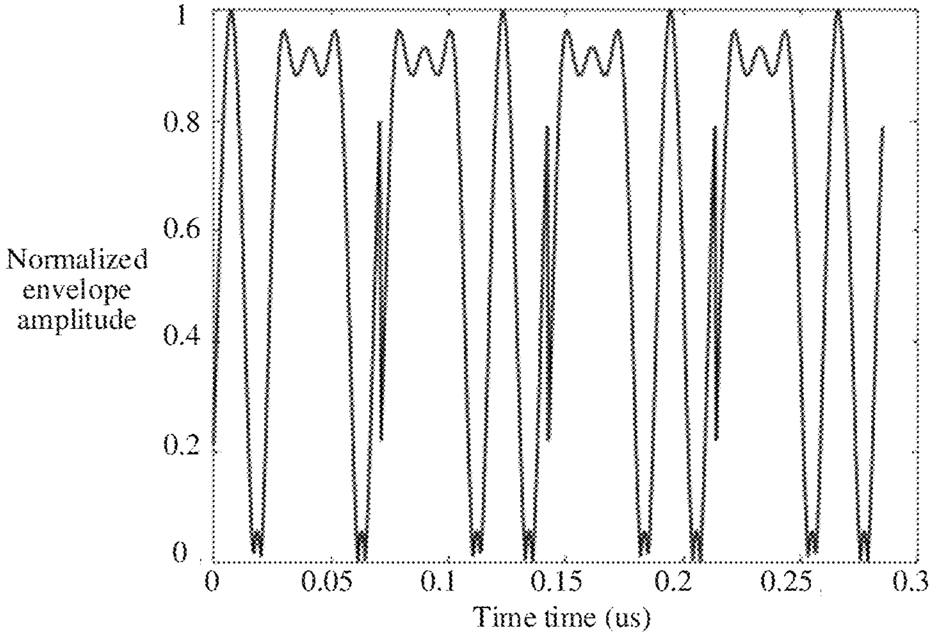
FIG. 7B is a waveform diagram of a generated second signal whose guard interval data is a CP according to an embodiment of this application.

FIG. 7B shows a generated second signal whose guard interval data is a CP according to an embodiment of this application. This manner may be compatible with a physical layer parameter of the LTE cellular system and a physical layer parameter of the NR cellular system.

Figure 7C:
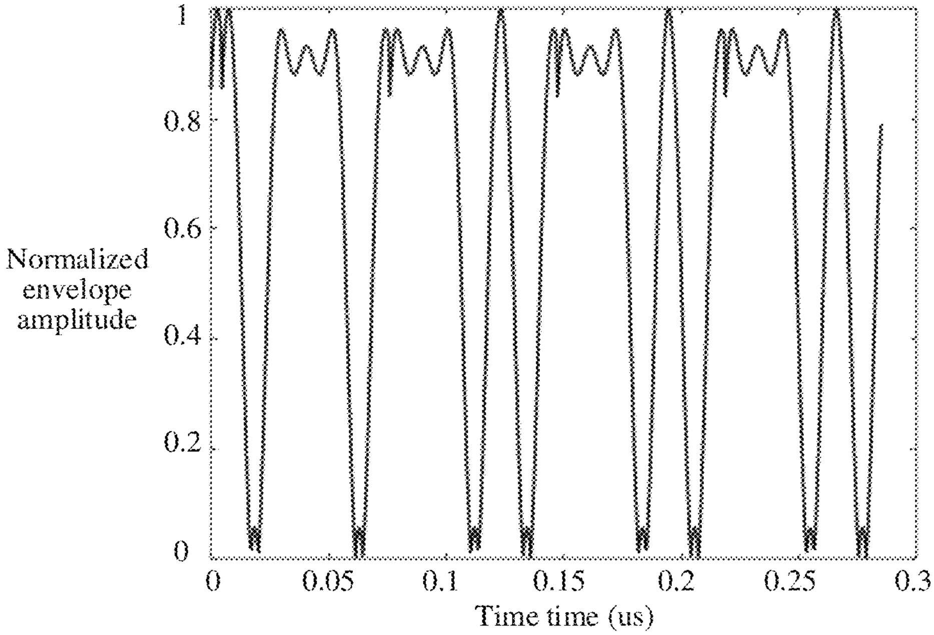
FIG. 7C is a waveform diagram of a generated second signal whose guard interval data is data of first N sampling points of a first signal according to an embodiment of this application.

FIG. 7C shows a generated second signal whose guard interval data is data of first N sampling points of a first signal according to an embodiment of this application. It can be learned from FIG. 7C that, an envelope ripple of the second signal is smaller than an envelope ripple of the second signal shown in FIG. 7B. This is more conducive to demodulating the ASK signal by a terminal side.

Figure 7D:
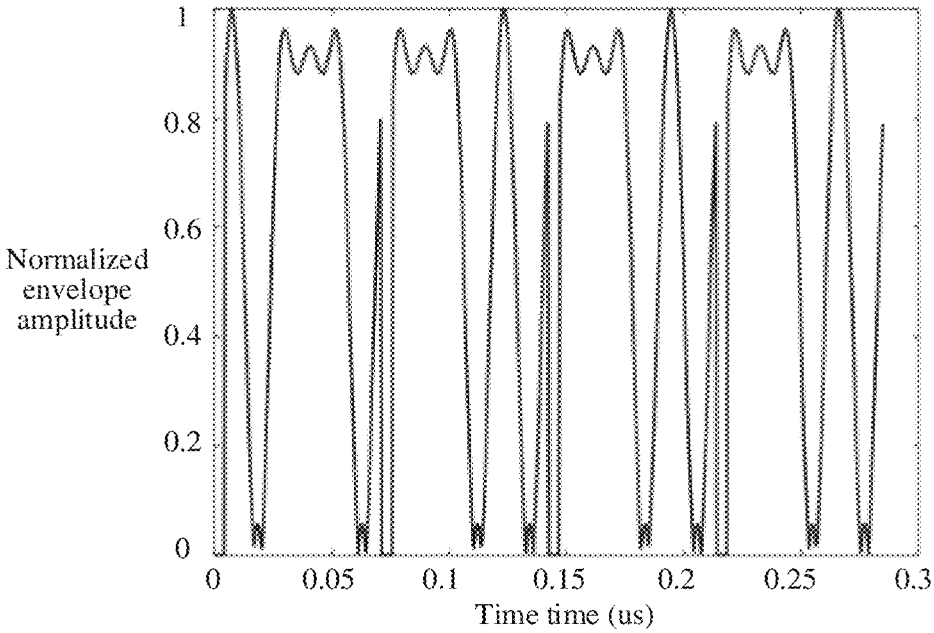
FIG. 7D is a waveform diagram of a generated second signal whose guard interval data is N zeros according to an embodiment of this application.

FIG. 7D shows a generated second signal whose guard interval data is N zeros according to an embodiment of this application. It can be learned from FIG. 7D that an envelope ripple of the second signal is greater than an envelope ripple shown in FIG. 8, but is not greatly different from the envelope ripple of the second signal shown in FIG. 7B. In addition, an amplitude change of the second signal shown in FIG. 7D is greater than an amplitude change of the second signal shown in FIG. 7C, but is not greatly different from an amplitude change of the second signal shown in FIG. 7B.

Figure 8:
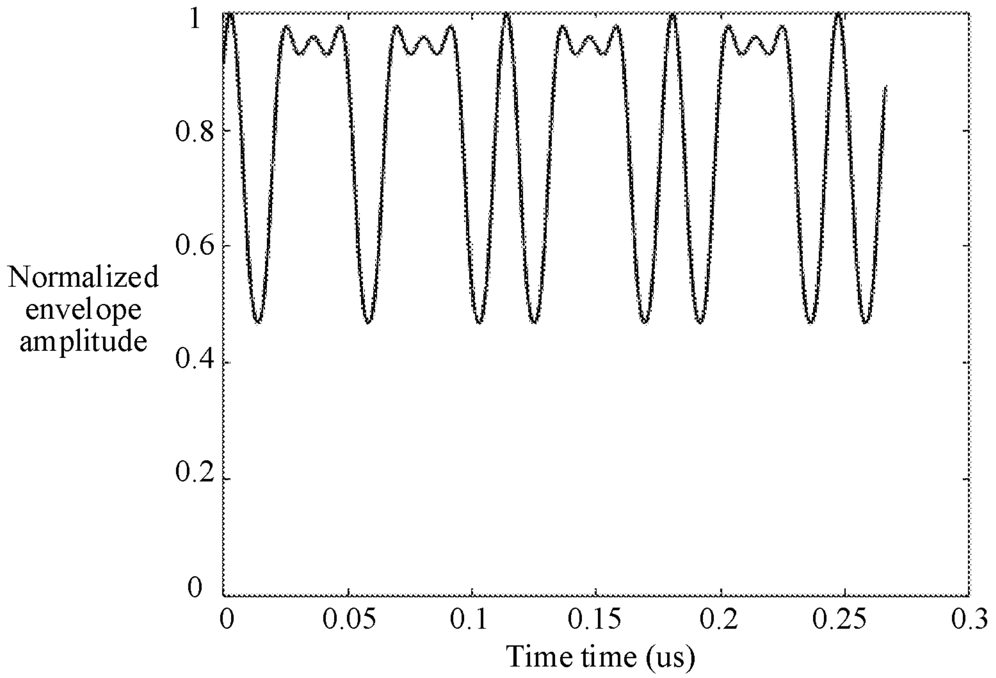
FIG. 8 is a waveform diagram of a second signal according to an embodiment of this application.

In this embodiment of this application, when the original bit sequence is “01101010”, and the first constellation point set includes the constellation point 1 and the constellation point 2 shown in FIG. 5D, a second signal shown in FIG. 8 may be generated. It can be learned from FIG. 8 that, compared with an existing OOK signal (the OOK signal shown in FIG. 1), the second signal generated in this embodiment of this application has a smaller envelope ripple in time domain, and a single OFDM symbol in the second signal includes multi-bit data information, so that higher spectral efficiency is achieved.

In this embodiment of this application, the base station may generate a plurality of second signals with different modulation depths. Specifically, when mapping the first bit sequence to the first modulation symbol sequence, the base station may determine different first constellation point sets for mapping based on the modulation depths. It is assumed that there are two modulation symbols in the first constellation point set. The two modulation symbols may be any two points in any group of constellation points in any constellation diagram shown in FIG. 5A to FIG. 5C. Table 1 below shows modulation depths that can be achieved by a 16QAM modulation scheme, a 64QAM modulation scheme, and a 256QAM modulation scheme.

TABLE 1

Table of modulation depths achieved by each modulation scheme

| Modulation scheme | Amplitude ratio of a constellation point | Achievable ASK modulation depth |
|---|---|---|
| 16QAM | 3:1 | 66.7% |
| 64QAM | 7:5 to 7:1 | 28.6% to 85.7% |
| 256QAM | 15:13 to 15:1 | 13.3% to 93.3% |

The 256QAM constellation diagram in FIG. 5C is used as an example for description. If the first point identified from right to left and the last point identified from right to left in the constellation points in the first quadrant are selected as the first constellation point set, a modulation depth of a generated first signal is a maximum modulation depth that can be achieved in the modulation scheme. If the first point identified from right to left and the second point identified from right to left in the constellation points in the first quadrant are selected as the first constellation point set, a modulation depth of a generated first signal is a minimum modulation depth that can be achieved in the modulation scheme.

The base station may generate second signals with different modulation depths based on different requirements and modulation depths that can be achieved in the foregoing modulation schemes.

It is assumed that the base station intends to change the modulation depth to generate a third signal. In this case, when mapping a second bit sequence to a fourth modulation symbol sequence, the base station may select a second constellation point set. The second constellation point set may include a third modulation symbol and a fourth modulation symbol. An amplitude of the third modulation symbol is different from an amplitude of the fourth modulation symbol. Optionally, a phase of the third modulation symbol may be the same as or different from a phase of the fourth modulation symbol. Because the modulation depths are different, a ratio of the amplitude of the third modulation symbol to the amplitude of the fourth modulation symbol is different from a ratio of an amplitude of a first modulation symbol in the first constellation point set to an amplitude of a second modulation symbol in the first constellation point set. The base station may perform a DFT, weighting, and an IFFT on symbols in the fourth modulation symbol sequence to obtain the third signal. In this way, a modulation depth of the obtained third signal is different from that of the second signal.

Optionally, the base station may also obtain a fourth signal based on the second constellation point set. The fourth signal may include a plurality of third signals, and guard interval data is added before each third signal. For the guard interval data before the third signal, refer to the guard interval data before the first signal. Details are not described herein again.

Figure 9:
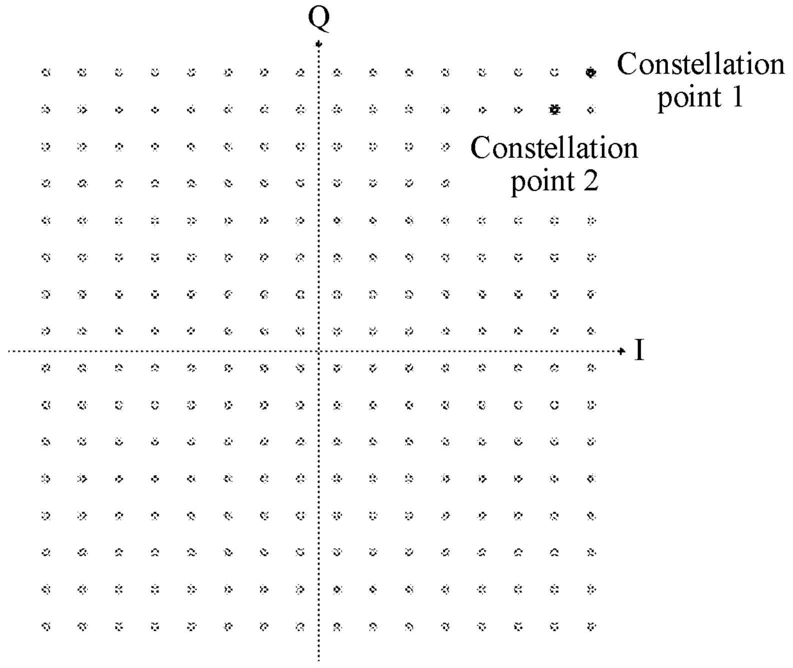
FIG. 9 is a schematic diagram of a second constellation set according to an embodiment of this application.

It is assumed that the original bit sequence is “01101010”. After the base station performs PIE encoding and a bit repetition operation on the original bit sequence, an obtained second bit sequence may be “1100111111001111110011001111110011001111111001100”. Refer to FIG. 9. The second constellation point set may include a constellation point 1 and a constellation point 2 in a constellation diagram shown in FIG. 9. According to the constellation diagram shown in FIG. 9, the base station may first map one bit to eight bits based on the second constellation point set. The bit “0” is mapped to “00111100”, and the bit “1” is mapped to “00111111”. Specifically, the second bit sequence “1100111111001111110011001111110011-00111111001100” may be mapped to “0011111100111111-001111000011110000111111001111110011111100111111-001111110011111100 1111000011110000111111001111-1100111111001111110011111100111111001111100001111-0000111 1110011111100111100001111000011111110011-11110011111100111111001111110011111100111100 0011-1100001111110011111100111100001111000011111110011-1111001111110011111100111111001 111110011110000-11110000111111001111110011110000111100” by using the second constellation point set.

After mapping one bit to eight bits, the base station may map the foregoing bit sequence to the fourth modulation symbol sequence by using the foregoing formula (1). According to the foregoing formula (1), “00111100” is mapped to a complex number $$\frac{13}{\sqrt{170}}(1+j),$$

and “00111111” is mapped to $$\frac{15}{\sqrt{170}}(1+j).$$

Therefore, the base station may map the second bit sequence “110011111100111111001100111111001100111111001100” to the fourth modulation symbol sequence $$“\frac{15}{\sqrt{170}}(1+j),\ \frac{15}{\sqrt{170}}(1+j),\ \frac{13}{\sqrt{170}}(1+j),\ \frac{13}{\sqrt{170}}(1+j),\ \frac{15}{\sqrt{170}}(1+j),$$

$$\frac{15}{\sqrt{170}}(1+j),\ \frac{15}{\sqrt{170}}(1+j),\ \frac{15}{\sqrt{170}}(1+j),\ \frac{15}{\sqrt{170}}(1+j),\ \frac{15}{\sqrt{170}}(1+j),$$

$$\frac{13}{\sqrt{170}}(1+j),\ \frac{13}{\sqrt{170}}(1+j),\ \frac{15}{\sqrt{170}}(1+j),\ \frac{15}{\sqrt{170}}(1+j),\ \frac{15}{\sqrt{170}}(1+j),$$

$$\frac{15}{\sqrt{170}}(1+j),\ \frac{15}{\sqrt{170}}(1+j),\ \frac{15}{\sqrt{170}}(1+j),\ \frac{13}{\sqrt{170}}(1+j),\ \frac{13}{\sqrt{170}}(1+j),$$

$$\frac{15}{\sqrt{170}}(1+j),\ \frac{15}{\sqrt{170}}(1+j),\ \frac{13}{\sqrt{170}}(1+j),\ \frac{13}{\sqrt{170}}(1+j),\ \frac{15}{\sqrt{170}}(1+j),$$

$$\frac{15}{\sqrt{170}}(1+j),\ \frac{15}{\sqrt{170}}(1+j),\ \frac{15}{\sqrt{170}}(1+j),\ \frac{15}{\sqrt{170}}(1+j),\ \frac{15}{\sqrt{170}}(1+j),$$

$$\frac{13}{\sqrt{170}}(1+j),\ \frac{13}{\sqrt{170}}(1+j),\ \frac{15}{\sqrt{170}}(1+j),\ \frac{15}{\sqrt{170}}(1+j),\ \frac{13}{\sqrt{170}}(1+j),$$

$$\frac{13}{\sqrt{170}}(1+j),\ \frac{15}{\sqrt{170}}(1+j),\ \frac{15}{\sqrt{170}}(1+j),\ \frac{15}{\sqrt{170}}(1+j),\ \frac{15}{\sqrt{170}}(1+j),$$

$$\frac{15}{\sqrt{170}}(1+j),\ \frac{15}{\sqrt{170}}(1+j),\ \frac{13}{\sqrt{170}}(1+j),\ \frac{13}{\sqrt{170}}(1+j),$$

$$\frac{15}{\sqrt{170}}(1+j),\ \frac{15}{\sqrt{170}}(1+j),\ \frac{13}{\sqrt{170}}(1+j),\ \frac{13}{\sqrt{170}}(1+j)”$$

by using the constellation point 1 and the constellation point 2 shown in FIG. 9.

Figure 10:
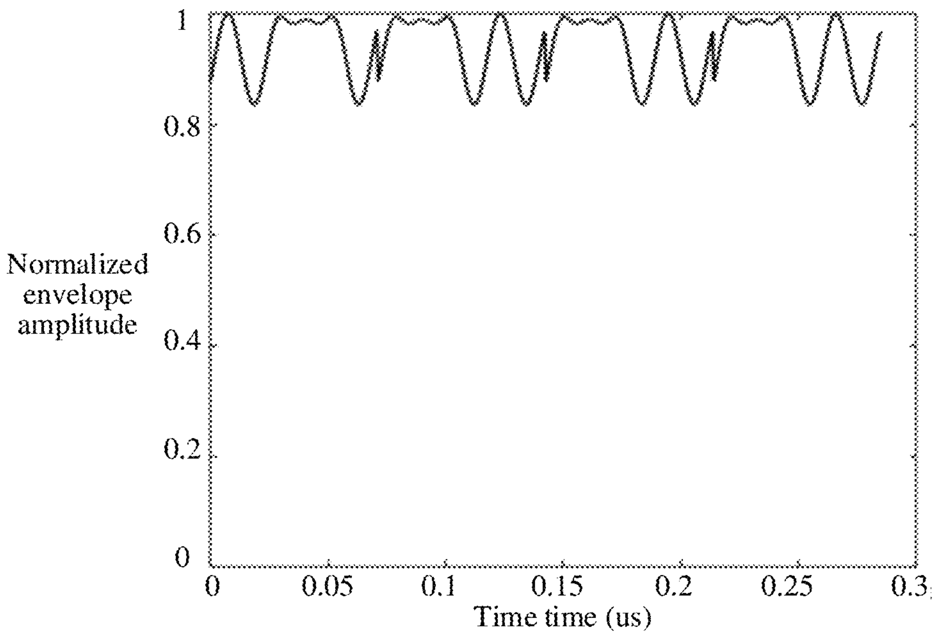
FIG. 10 is a waveform diagram of a fourth signal generated according to an embodiment of this application.

The base station may perform a DFT, weighting, and an IFFT on the modulation symbols in the fourth modulation symbol sequence to obtain the third signal. FIG. 10 is a schematic diagram of a generated fourth signal according to an embodiment of this application. Added guard interval data is a CP. Compared with each first signal in the second signal generated in FIG. 7A, an amplitude range of each third signal in the fourth signal in FIG. 10 is 0.82 to 1, and an amplitude does not change greatly, but an average value is large. Therefore, an obtained ASK modulated signal has low useful signal power and high carrier power, thereby meeting a requirement of a passive terminal for high charging power. However, an amplitude range of each first signal in the second signal shown in FIG. 7A is 0 to 1, and an amplitude changes greatly but an average value is small. In this case, an obtained ASK modulated signal has high useful signal power and low carrier power, thereby meeting a requirement of a semi-passive terminal for high useful signal power.

Based on the foregoing solution, the base station may flexibly change a modulation depth of a transmission signal, and flexibly allocate power between useful signal power and carrier power, thereby meeting different requirements of the passive terminal for high charging power and the semi-passive terminal for high signal power.

It may be understood that, to implement functions in the foregoing embodiments, the base station and the terminal include corresponding hardware structures and/or software modules for performing the functions. A person skilled in the art should be easily aware that, based on units and method steps in the examples described in embodiments disclosed in this application, this application can be implemented by hardware or a combination of hardware and computer software. Whether a function is performed by hardware or hardware driven by computer software depends on a particular application and a design constraint of the technical solutions.

Figure 11:
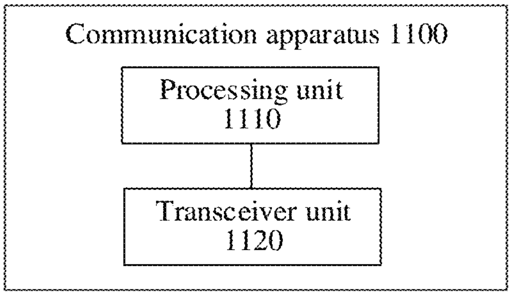
FIG. 11 is a structural diagram of a communication apparatus according to an embodiment of this application.
Figure 12:
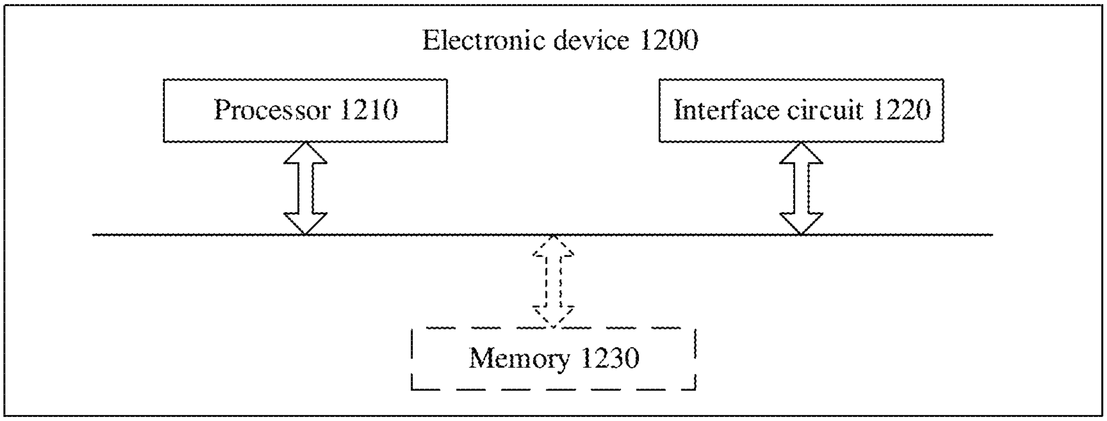
FIG. 12 is a structural diagram of a communication device according to an embodiment of this application.

FIG. 11 and FIG. 12 are schematic structural diagrams of possible communication apparatuses according to embodiments of this application. The communication apparatuses may be configured to implement the function of the base station in the foregoing method embodiments. Therefore, beneficial effects of the foregoing method embodiments can also be achieved. In this embodiment of this application, the communication apparatus may be the base station 110*a* or 110*b* shown in FIG. 1, or may be a module (for example, a chip) used in the base station.

As shown in FIG. 11, a communication apparatus 1100 includes a processing unit 1110 and a transceiver unit 1120. The communication apparatus 1100 is configured to implement the function of the base station in the method embodiment shown in FIG. 4.

When the communication apparatus 1100 is configured to implement the function of the base station in the method embodiment shown in FIG. 4, the processing unit 1110 is configured to: obtain a first bit sequence, map the first bit sequence to a first modulation symbol sequence, perform a DFT on each modulation symbol in the first modulation symbol sequence to obtain a second modulation symbol sequence, perform weighting on the second modulation symbol sequence to obtain a third modulation symbol sequence, and perform an IFFT on the third modulation symbol sequence to obtain a first signal. The transceiver unit 1120 is configured to send a second signal, where the second signal includes the first signal.

For more detailed descriptions of the processing unit 1110 and the transceiver unit 1120, directly refer to related descriptions in the method embodiments shown in FIG. 4 to FIG. 10.

As shown in FIG. 12, a communication device 1200 includes a processor 1210 and an interface circuit 1220. The processor 1210 and the interface circuit 1220 are coupled to each other. It can be understood that the interface circuit 1220 may be a transceiver or an input/output interface. Optionally, the communication device 1200 may further include a memory 1230. The memory is configured to store instructions executed by the processor 1210, or store input data required by the processor 1210 to run instructions, or store data generated after the processor 1210 runs instructions.

When the communication device 1200 is configured to implement the method shown in FIG. 4, the processor 1210 is configured to implement a function of the foregoing processing unit 1110, and the interface circuit 1220 is configured to implement a function of the foregoing transceiver unit 1120.

When the foregoing communication apparatus is a module used in the base station, the base station module implements the function of the base station in the foregoing method embodiment. The base station module receives information from another module (for example, a radio frequency module or an antenna) in the base station, where the information is sent by a terminal to the base station; or the base station module sends information to another module (for example, a radio frequency module or an antenna) in the base station, where the information is sent by the base station to a terminal. The base station module herein may be a baseband chip in the base station, or may be a DU or another module. The DU herein may be a DU in an open radio access network (O-RAN) architecture.

It should be understood that, the processor in embodiments of this application may be a central processing unit (CPU), or may be another general-purpose processor, a digital signal processor (DSP), an application-specific integrated circuit (ASIC), a field programmable gate array (FPGA), or another programmable logical device, a transistor logic device, a hardware component, or any combination thereof. The general-purpose processor may be a microprocessor or any regular processor.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may also be a component of the processor. The processor and the storage medium may be located in an ASIC. In addition, the ASIC may be located in a base station or a terminal. Certainly, the processor and the storage medium may alternatively exist in a base station or a terminal as discrete components.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs or instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, a computer, a server, or a data center to another website, computer, server, or data center in a wired or wireless manner. The computer-readable storage medium may be any available medium accessible by a computer, or a data storage device, such as, a server or a data center, integrating one or more available media. The available medium may be a magnetic medium, for example, a floppy disk, a hard disk, or a magnetic tape; or may be an optical medium, for example, a digital video disc; or may be a semiconductor medium, for example, a solid-state drive. The computer-readable storage medium may be a volatile or non-volatile storage medium, or may include two types of storage media: a volatile storage medium and a non-volatile storage medium.

In embodiments of this application, unless otherwise specified or a logical conflict occurs, terms and/or descriptions in different embodiments are consistent and may be mutually referenced, and technical features in different embodiments may be combined to form a new embodiment based on an internal logical relationship of the different embodiments.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be in a singular form or a plural form. In the text descriptions of this application, a character "/" generally indicates that associated objects are in an "or" relationship. In the formula of this application, the character "/" indicates that associated objects are in a "division" relationship. "Including at least one of A, B, and C" may represent: including A; including B; including C; including A and B; including A and C; including B and C; and including A, B, and C.

It may be understood that various numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes.

What is claimed is:

1. A signal transmission method, comprising:

obtaining a first bit sequence;

mapping the first bit sequence to a first modulation symbol sequence, wherein a value of each modulation symbol in the first modulation symbol sequence belongs to a first constellation point set, the first constellation point set comprises K modulation symbols, each of the K modulation symbols has a different amplitude, $K \geq 2$, and K is an integer, wherein the first constellation point set further comprises a first modulation symbol and a second modulation symbol;

performing a discrete Fourier transform (DFT) on each modulation symbol in the first modulation symbol sequence to obtain a second modulation symbol sequence;

performing weighting on the second modulation symbol sequence to obtain a third modulation symbol sequence;

performing an inverse discrete Fourier transform (IFFT) on the third modulation symbol sequence to obtain a first signal;

sending a second signal, wherein the second signal comprises the first signal;

obtaining a second bit sequence;

mapping the second bit sequence to a fourth modulation symbol sequence, wherein a value of each modulation symbol in the fourth modulation symbol sequence belongs to a second constellation point set, the second constellation point set comprises a third modulation symbol and a fourth modulation symbol, an amplitude of the third modulation symbol is different from an amplitude of the fourth modulation symbol, and a ratio of the amplitude of the third modulation symbol to the amplitude of the fourth modulation symbol is different from a ratio of an amplitude of the first modulation symbol to an amplitude of the second modulation symbol;

performing a DFT on each modulation symbol in the fourth modulation symbol sequence to obtain a fifth modulation symbol sequence;

performing weighting on the fifth modulation symbol sequence to obtain a sixth modulation symbol sequence;

performing an IFFT on the sixth modulation symbol sequence to obtain a third signal; and seconding the third signal.

2. The method according to claim 1, wherein the each of the K modulation symbols has a different amplitude comprises:

each of the K modulation symbols has a different amplitude and each of the K modulation symbols has a same phase, or each of the K modulation symbols has a different amplitude and each of the K modulation symbols has a different phase.

3. The method according to claim 1, wherein the obtaining a first bit sequence comprises:

obtaining an original bit sequence;

performing line encoding on the original bit sequence to obtain an encoded bit sequence; and performing a bit repetition operation on the encoded bit sequence to obtain the first bit sequence.

4. The method according to claim 1, wherein the second signal comprises a plurality of orthogonal frequency division multiplexing (OFDM) symbols, and the first signal is one of the plurality of OFDM symbols; and guard interval data is comprised before each OFDM symbol in the second signal, and the guard interval data before the first signal comprises one of:

N pieces of data or N zeros from front to back in the first signal, wherein N is a positive integer.

5. The method according to claim 1, wherein the K modulation symbols are K points in any one of:

a 16 quadrature amplitude modulation (QAM) constellation diagram, a 64QAM constellation diagram, a 256QAM constellation diagram, a 1024QAM constellation diagram, a 4096QAM constellation diagram, or an amplitude and phase-shift keying (APSK) constellation diagram.

6. The method according to claim 1, wherein K=2.

7. The non-transitory computer-readable storage medium according to claim 1, wherein the K modulation symbols are K points in any one of:

a 16 quadrature amplitude modulation (QAM) constellation diagram, a 64QAM constellation diagram, a 256QAM constellation diagram, a 1024QAM constellation diagram, a 4096QAM constellation diagram, or an amplitude and phase-shift keying (APSK) constellation diagram.

8. A communication apparatus, comprising a processor and a transceiver, wherein the processor is configured to: obtain a first bit sequence; map the first bit sequence to a first modulation symbol sequence, wherein a value of each modulation symbol in the first modulation symbol sequence belongs to a first constellation point set, the first constellation point set comprises K modulation symbols, each of the K modulation symbols has a different amplitude, K≥2, and K is an integer, wherein the first constellation point set further comprises a first modulation symbol and a second modulation symbol; perform a discrete Fourier transform (DFT) on each modulation symbol in the first modulation symbol sequence to obtain a second modulation symbol sequence; perform weighting on the second modulation symbol sequence to obtain a third modulation symbol sequence; and perform an inverse discrete Fourier transform (IFFT) on the third modulation symbol sequence to obtain a first signal; obtain a second bit sequence; map the second bit sequence to a fourth modulation symbol sequence, wherein a value of each modulation symbol in the fourth modulation symbol sequence belongs to a second constellation point set, the second constellation point set comprises a third modulation symbol and a fourth modulation symbol, an amplitude of the third modulation symbol is different from an amplitude of the fourth modulation symbol, and a ratio of the amplitude of the third modulation symbol to the amplitude of the fourth modulation symbol is different from a ratio of an amplitude of the first modulation symbol to an amplitude of the second modulation symbol; perform a DFT on each modulation symbol in the fourth modulation symbol sequence to obtain a fifth modulation symbol sequence; perform weighting on the fifth modulation symbol sequence to obtain a sixth modulation symbol sequence; and perform an IFFT on the sixth modulation symbol sequence to obtain a third signal; and the transceiver is configured to: send a second signal, wherein the second signal comprises the first signal; and send the third signal.

9. The apparatus according to claim 8, wherein that each of the K modulation symbols has a different amplitude comprises:

each of the K modulation symbols has a different amplitude and each of the K modulation symbols has a same phase, or each of the K modulation symbols has a different amplitude and each of the K modulation symbols has a different phase.

10. The apparatus according to claim 8, wherein when obtaining the first bit sequence, the processor is specifically configured to:

obtain an original bit sequence;

perform line encoding on the original bit sequence to obtain an encoded bit sequence; and perform a bit repetition operation on the encoded bit sequence to obtain the first bit sequence.

11. The apparatus according to claim 8, wherein the second signal comprises a plurality of orthogonal frequency division multiplexing (OFDM) symbols, and the first signal is one of the plurality of OFDM symbols; and guard interval data is comprised before each OFDM symbol in the second signal, and the guard interval data before the first signal comprises one of:

N pieces of data or N zeros from front to back in the first signal, wherein N is a positive integer.

12. The apparatus according to claim 8, wherein the K modulation symbols are K points in any one of:

a 16 quadrature amplitude modulation (QAM) constellation diagram, a 64QAM constellation diagram, a 256QAM constellation diagram, a 1024QAM constellation diagram, a 4096QAM constellation diagram, or an amplitude and phase-shift keying (APSK) constellation diagram.

13. The apparatus according to claim 8, wherein K=2.

14. A non-transitory computer-readable storage medium storing instructions which, when executed by a communication apparatus, cause the communication apparatus to perform operations comprising:

obtaining a first bit sequence;

mapping the first bit sequence to a first modulation symbol sequence, wherein a value of each modulation symbol in the first modulation symbol sequence belongs to a first constellation point set, the first constellation point set comprises K modulation symbols, each of the K modulation symbols has a different amplitude, K≥2, and K is an integer, wherein the first constellation point set further comprises a first modulation symbol and a second modulation symbol;

performing a discrete Fourier transform (DFT) on each modulation symbol in the first modulation symbol sequence to obtain a second modulation symbol sequence;

performing weighting on the second modulation symbol sequence to obtain a third modulation symbol sequence;

performing an inverse discrete Fourier transform (IFFT) on the third modulation symbol sequence to obtain a first signal;

sending a second signal, wherein the second signal comprises the first signal;

obtaining a second bit sequence;

mapping the second bit sequence to a fourth modulation symbol sequence, wherein a value of each modulation symbol in the fourth modulation symbol sequence belongs to a second constellation point set, the second constellation point set comprises a third modulation symbol and a fourth modulation symbol, an amplitude of the third modulation symbol is different from an amplitude of the fourth modulation symbol, and a ratio of the amplitude of the third modulation symbol to the amplitude of the fourth modulation symbol is different from a ratio of an amplitude of the first modulation symbol to an amplitude of the second modulation symbol;

performing a DFT on each modulation symbol in the fourth modulation symbol sequence to obtain a fifth modulation symbol sequence;

performing weighting on the fifth modulation symbol sequence to obtain a sixth modulation symbol sequence;

performing an IFFT on the sixth modulation symbol sequence to obtain a third signal; and sending the third signal.

15. The non-transitory computer-readable storage medium according to claim 14, wherein the each of the K modulation symbols has a different amplitude comprises:

each of the K modulation symbols has a different amplitude and each of the K modulation symbols has a same phase, or each of the K modulation symbols has a different amplitude and each of the K modulation symbols has a different phase.

16. The non-transitory computer-readable storage medium according to claim 14, wherein the obtaining a first bit sequence comprises:

obtaining an original bit sequence;

performing line encoding on the original bit sequence to obtain an encoded bit sequence; and performing a bit repetition operation on the encoded bit sequence to obtain the first bit sequence.

17. The non-transitory computer-readable storage medium according to claim 14, wherein the second signal comprises a plurality of orthogonal frequency division multiplexing (OFDM) symbols, and the first signal is one of the plurality of OFDM symbols; and guard interval data is comprised before each OFDM symbol in the second signal, and the guard interval data before the first signal comprises:

N pieces of data or N zeros from front to back in the first signal, wherein N is a positive integer.

* * * * *